United States Patent
Emmanuel et al.

(10) Patent No.: US 9,826,423 B2
(45) Date of Patent: Nov. 21, 2017

(54) SYSTEMS AND METHODS FOR LTE AND WLAN COEXISTENCE

(71) Applicant: Netgear, Inc., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 122 days.

(21) Appl. No.: 14/569,259

(22) Filed: Dec. 12, 2014

(65) Prior Publication Data

US 2016/0174233 A1 Jun. 16, 2016

(51) Int. Cl.
| | |
|---|---|
| H04W 52/24 | (2009.01) |
| H04W 24/08 | (2009.01) |
| H04W 48/18 | (2009.01) |
| H04W 52/38 | (2009.01) |
| H04W 84/12 | (2009.01) |
| H04W 74/08 | (2009.01) |
| H04W 24/02 | (2009.01) |

(52) U.S. Cl.
CPC .......... H04W 24/08 (2013.01); H04W 48/18 (2013.01); H04W 52/243 (2013.01); H04W 52/38 (2013.01); H04W 24/02 (2013.01); H04W 74/085 (2013.01); H04W 84/12 (2013.01)

(58) Field of Classification Search
None
See application file for complete search history.

(56) References Cited

U.S. PATENT DOCUMENTS

| | | | |
|---|---|---|---|
| 2011/0211468 A1 | 9/2011 | Zhang et al. | |
| 2012/0176923 A1* | 7/2012 | Hsu | H04W 52/243 370/252 |
| 2014/0031036 A1* | 1/2014 | Koo | H04W 36/20 455/434 |
| 2014/0064301 A1* | 3/2014 | Rison | H04W 74/085 370/448 |

(Continued)

OTHER PUBLICATIONS

IEEE Std 802.11h™—2003, Part 11: Wireless LAN Medium Access Control (MAC) and Physical Layer (PHY) specifications, Amendment 5: Spectrum and Transmit Power Management Extensions in the 5GHz band in Europe; IEEE Computer Society, The Institute of Electronic and Electrical Engineers, New York, NY, Oct. 14, 2003, pp. 1-59.

*Primary Examiner* — Edan Orgad
*Assistant Examiner* — Saumit Shah
(74) *Attorney, Agent, or Firm* — Perkins Coie LLP (57) ABSTRACT

Various of the disclosed embodiments provide systems and methods for enabling LTE® and wireless, e.g., ISM band, applications to coexist on a same device or on separate devices in proximity to one another. Some embodiments implement a remediation and/or channel transition process for the wireless devices following detection of LTE®-related interference. During remediation, the device may, e.g., adjust the wireless power levels, EDCA backoff times, signal thresholds, etc. In some embodiments, if the remediation actions prove ineffective, the wireless peers may be relocated to a channel further from the interfering LTE® band. The determination to remediate or reallocate may be based on various contextual factors, e.g., the character of the peer devices and the applications being run.

21 Claims, 7 Drawing Sheets

(56) References Cited

U.S. PATENT DOCUMENTS

| | | | |
|---|---|---|---|
| 2014/0286203 A1* | 9/2014 | Jindal | H04J 11/0026 370/278 |
| 2015/0036514 A1* | 2/2015 | Zhu | H04W 52/244 370/252 |
| 2015/0105067 A1* | 4/2015 | Valliappan | H04W 74/0808 455/424 |
| 2015/0245365 A1* | 8/2015 | Isokangas | H04W 72/1226 455/423 |
| 2016/0021586 A1 | 1/2016 | Akhi et al. | |
| 2016/0100430 A1 | 4/2016 | Dabeer et al. | |

* cited by examiner

SYSTEMS AND METHODS FOR LTE AND WLAN COEXISTENCE

TECHNICAL FIELD

The disclosed embodiments relate to systems and methods for communication coexistence.

BACKGROUND

The ubiquity of wireless devices has placed increasing demands upon scarce spectrum resources. For example, increased demand has threatened the coexistence of the Long Term Evolution (LTE®) and Industrial, Scientific, and Medical (ISM) bands. Interference from aggressive LTE® communications regularly enter the ISM range, confusing ISM receivers by appearing to be legitimate ISM communications. Powerful LTE® communications may even muffle ISM signals, preventing the ISM device from communicating with its peers. Where the LTE® and ISM transceivers reside on the same device and/or use many of the same firmware and hardware resources, the coexistence issues may be especially pronounced.

Time multiplexing LTE® and ISM signals would dramatically impede the data rate on each channel. Furthermore, the disparate devices of the wireless ecosystem are subject to little universal oversight. Thus, it is impractical to expect a holistic solution to be universally applied across all possible devices. However, seeking to accommodate the behaviors and idiosyncrasies of each implementation would likely also be counterproductive. Accordingly, there exists a need for adaptive systems and methods facilitating effective LTE® and ISM coexistence on a same device and on nearby devices.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various of the disclosed embodiments provide systems and methods for enabling LTE® and wireless, e.g., ISM and/or WiFi™ band, applications to coexist on a same device or on separate devices in proximity to one another. Some embodiments implement a remediation and/or channel transition process for the wireless devices following detection of LTE®-related interference. During remediation, the device may, e.g., adjust the wireless power levels, Enhanced Distribution Channel Access (EDCA) backoff times, signal thresholds, etc. In some embodiments, if the remediation actions prove ineffective, the wireless peers may be relocated to a channel further from the interfering LTE® band. The determination to remediate or reallocate may be based on various contextual factors, e.g., the character of the peer devices and the applications being run. "Wireless" communication as used herein refers substantially to any ISM band (e.g., as referenced in the ITU-Rs 5.138, 5.150, and 5.280 of the Radio Regulations of the International Telecommunication Union), though for purposes of explanation, bands near 2450 MHz and 5800 MHz, e.g., as used in to IEEE 802.11/WiFi™ communication, are generally considered.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Use Case Overview

Figure 1:
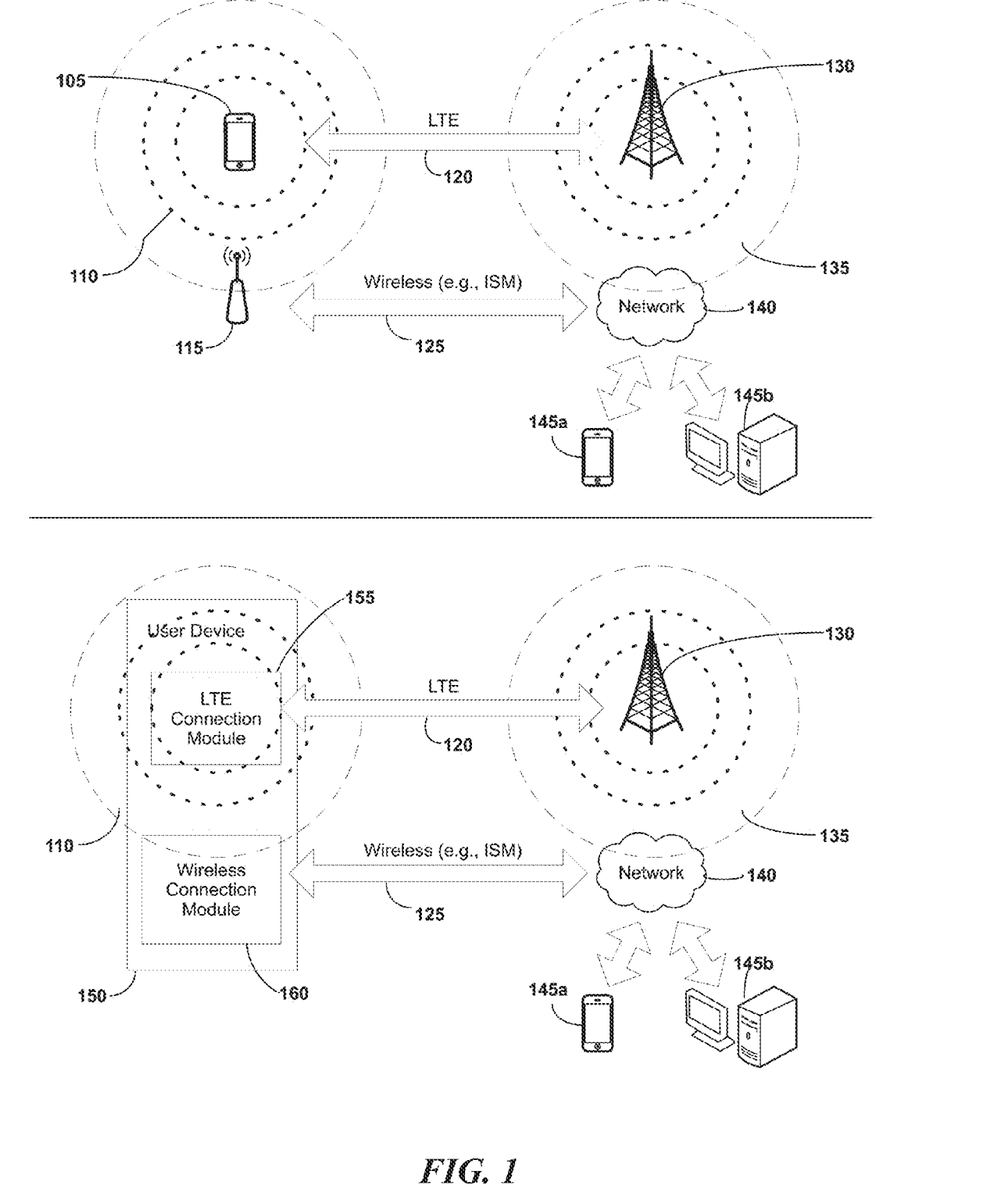
FIG. 1 is a block diagram illustrating example instances of LTE® and wireless interference as may occur in some embodiments.

FIG. 1 is a block diagram illustrating example instances of LTE® and wireless interference as may occur in some embodiments. A wireless communication device, e.g., an IEEE 802.11 access point (AP) 115, may communicate 125 across a network 140 with a variety of wireless devices 145a, 145b. While this communication 125 may occur within the appropriate wireless channel bands (e.g., the ISM bands), a nearby LTE® device 105 may also communicate with a base station 130 across an LTE® channel 120. Radio-frequency emissions 110, 135 from the LTE® device 105 and the base station 130 may interfere with the access point's 115 ability to communicate with the wireless devices 145a, 145b. For example, the access point may seek to communicate on channels near 2450 MHz. These frequencies may be sufficiently close to the LTE® band that interference results. Though depicted separately in the example 100a, one will recognize that the interfering LTE® device 105 may be the same as one of the wireless devices 145a, 145b communicating on the wireless network 140. For example, a smartphone device may enable simultaneous LTE® and ;wireless communication. Consequently, an access point 115 may be seeking to communicate with a device, e.g., device 145a on a Wi-Fi channel when that device is itself the cause of various LTE® interferences.

Thus, in some embodiments, for example, as depicted in example 100b, coexistence complications may also result for components located on a same device. For example, a user device 150, such as a mobile smartphone, may include both ISM wireless functionality via module 160 and LTE® functionality via module 155. One will recognize other devices sharing LTE® and wireless functionality (e.g. a combined WiFi™+LTE® router). Being located on the same device, the interference caused by emissions 110 from the LTE® module 155 may be especially pronounced at connection module 160. Some LTE® bands and WiFi™ bands may be very close in frequency to one another. However, interference may also result from harmonics in the LTE® band affecting the WiFi™ band. In addition to the loss of bandwidth resulting from interference, a receiver's sensitivity to a desired signal range may degrade over time due to interference (an effect referred to as "desensing").

Channel Allocation

Figure 2:
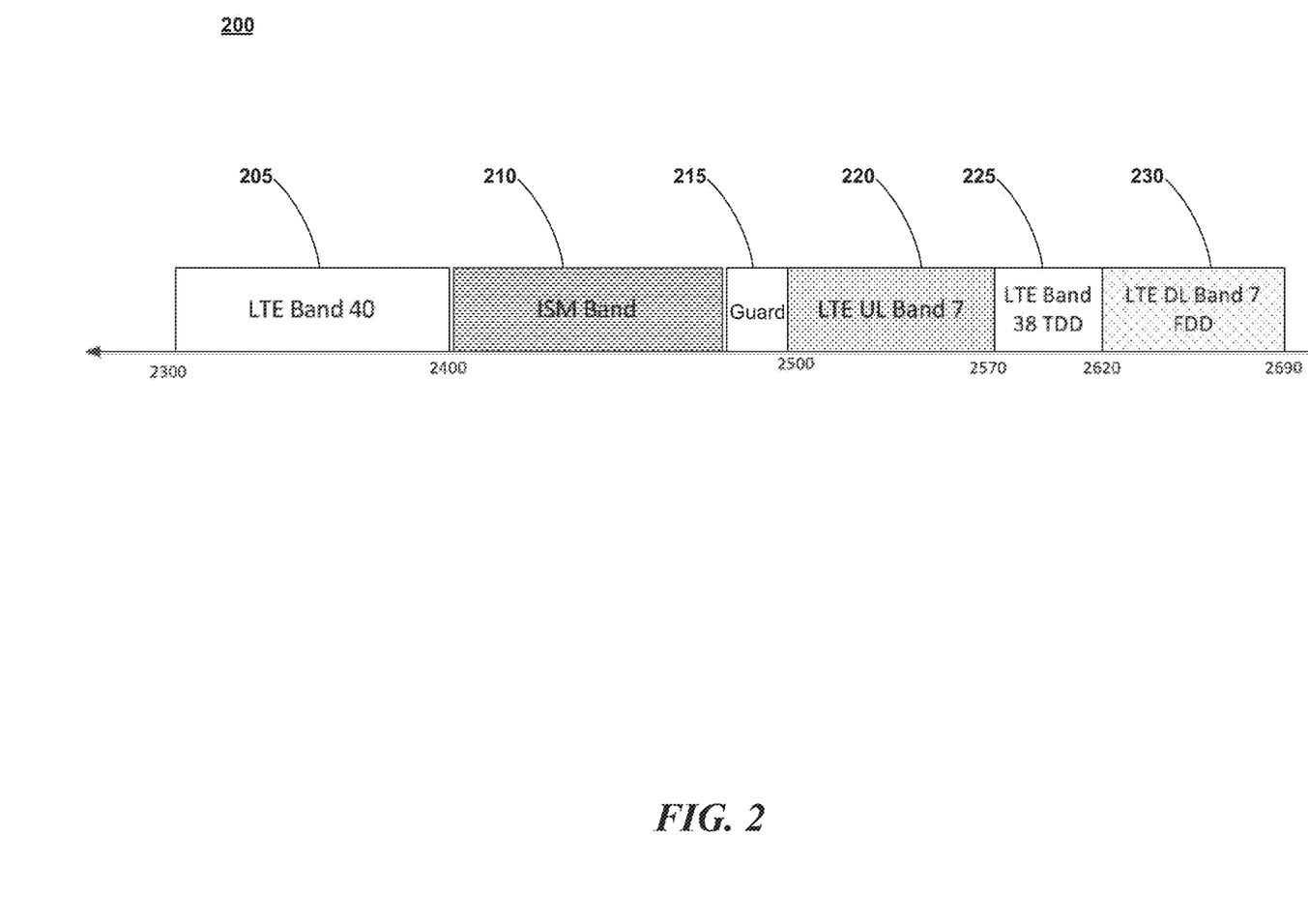
FIG. 2 is a block diagram illustrating the channel topology as may apply in some embodiments.

FIG. 2 is a block diagram illustrating the channel topology as may apply in some embodiments. In a particularly egregious scenario, LTE® Band 40 205 and LTE® band 7 220 are employed simultaneously with WiFi™ communication. These bands are adjacent to 2.4 G band in ISM 210 where many wireless LAN (WLAN) devices may be active. In some embodiments, harmonics from the bands 205, 225 and 230 may also affect the quality of transmissions on the ISM band 210. A guard region 215 may be ineffective in preventing these harmonics.

Various embodiments disclose adjustments to the transmitter and receiver of WLAN and LTE® devices to improve coexistence. A minimum interference tolerance may be defined for a receiver of ISM and LTE® communications. The wireless communication protocol may also be modified to reduce interference between the adjacent bands.

Channel Reallocation

Various embodiments consider extending channel switch announcement between bands as part of the coexistence analysis and remediation so that users can be moved, e.g., from 2.4 G to 5 GHz channels or other bands which experience less coexistence complications—in this manner following a coexistence interference determination as discussed herein appropriate corrective action may be taken. The specification may be modified, e.g., by extending channel announcement messages such that they can be addressed by only one client or a subset of clients, instead of moving all clients connected with an access point. The AP may determine which clients may remain allocated to bands experiencing LTE interference and those which will be relocated. The coexistence and remediation decision to relocate a client may be based on the percentage of time that LTE interference is active, the power of the LTE interfering signal, and the traffic requirement of the WIFI clients that are associated to the AP. The AP may send a packet directing the clients to be relocated as desired. Various embodiments contemplate a combination of smart channel selection of WiFi™ access points (APs), transmit power control on APs and/or at client devices, messaging between AP and clients for WiFi™ power control, smart receiver adjustment on WiFi™ and adding signaling such that LTE® traffic can be offloaded to Wi-Fi when possible.

The channel switch announcement element which is defined in section 8.4.2.18 in IEEE 802.11 may be modified in some embodiments to optionally add a client MAC address or client association ID (AID)s to identify clients the AP desires to move from one band to another (e.g., as described in greater detail herein in regard to TPC-related functions). For example, the packet may indicate, e.g., that clients are to transition from a 2.4 GHz radio to 5 GHz radio, from a 5 G radio to another 5 G radio, or from a 2.4 G radio to another 2.4 G radio. Some embodiments may take advantage of a new switch announcement element specifically targeted to moving clients from one radio on an AP to another radio. The switch announcement may be used for APs that have two radios on two bands, three radios on three bands, etc.

In some embodiments, the channel switch announcement may be appended to the announcement element that is transmitted within a beacon message. The channel transition may be accomplished by sending an action frame to each client to be moved. In some embodiments, the transition may instead be effected by sending a multicast or broadcast packets to several clients that need to be moved. The channel switch may also be combined with unicast data packets or other control or management packets.

The channel switch may be performed to provide a seamless switch and to minimize any disconnect time. A delay may be provided before a client switches the channel which considers what type of traffic the client encounters when the decision is made to switch. For example if client is receiving a VoIP call and the call can be maintained on the current channel, the switch may be postponed until the VoIP call is complete. But if the client is doing a file transfer the switch can be performed during the transfer without the client noticing. If the client is having a VoIP call and a channel switch is necessary, the switch may be attempted at the best time possible (e.g., the time least likely to disrupt the user's experience). For example, the switch may be performed in the silence period of a call when neither party is talking.

Packet exchange may be defined between the AP and client, where the AP asks the client if it can switch channels. The client takes into account, for example, the delay and TPUT requirement of the ongoing traffic when responding to the AP if a switch at this time is acceptable for the client. The AP takes client feedback into account in making a decision to move the client from one radio to another radio. The AP makes the final decision to keep a client on a radio or not.

Figure 3:
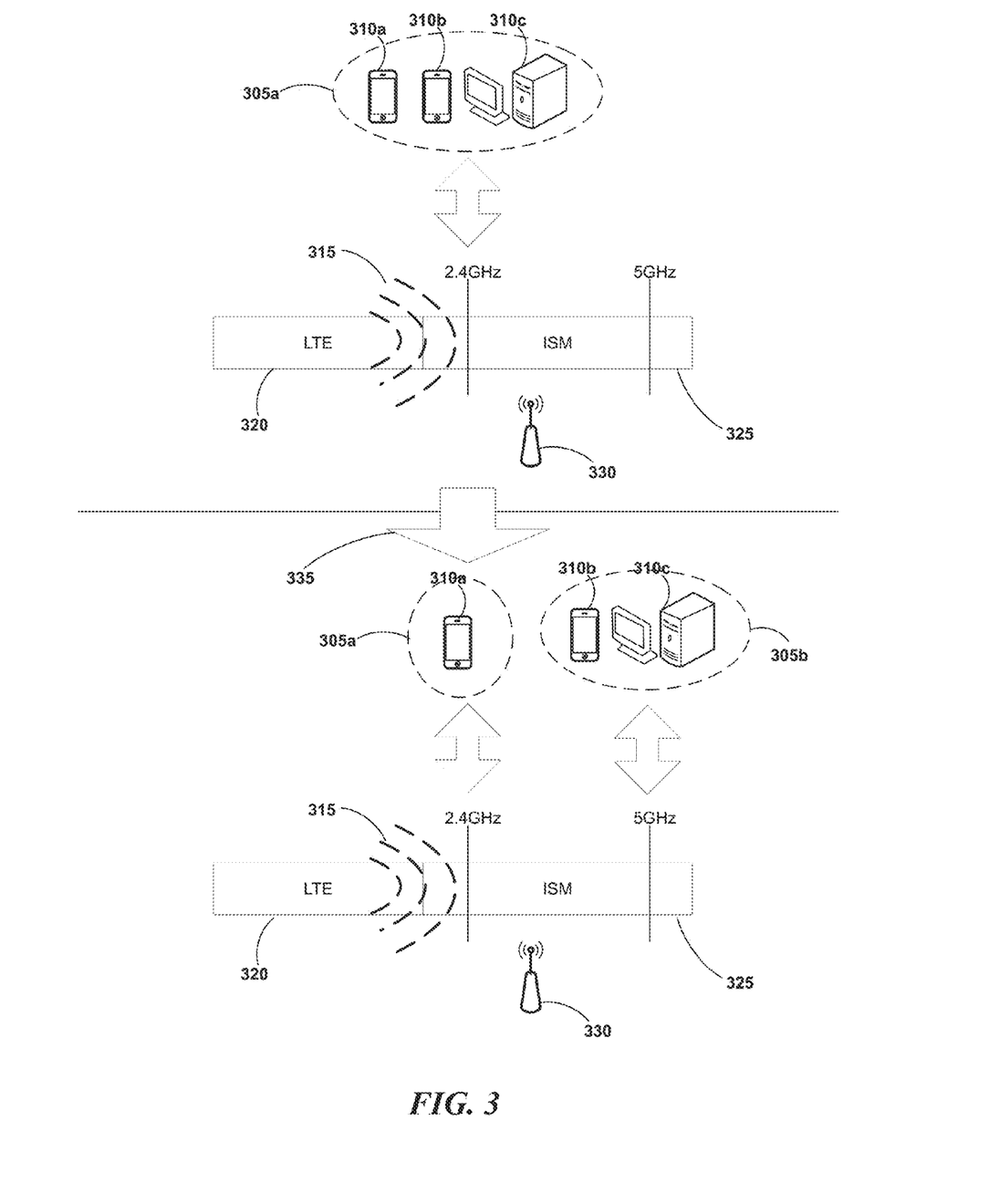
FIG. 3 is a block diagram illustrating an example channel reassignment as may occur in some embodiments.

FIG. 3 is a block diagram illustrating an example channel reassignment as may occur in some embodiments. Initially a plurality of wireless devices 310a, 310b, 310c may be in communication with an access point 330 on a 2.4 GHz channel 305a of an ISM band 325. Interference 315 from a neighboring LTE® band 320 may cause these communications to increasingly degrade. Access point 330 and/or devices 310a, 310b, 310c may detect this interference and propose a channel transition away from the LTE® band 320.

The AP 330 and devices 310a, 310b, 310c may collectively or unilaterally decided to transition 335 to a new band. In this example, some of the devices (devices 310b, 310c) have elected to communicate with the AP 330 on a 5 GHz channel 305b. In some embodiments, the AP 330 may detect the LTE® activity and select a channel that is spaced further from LTE® interference. For example, a higher part of 2.4 G band may be chosen when LTE® band 40 detected. Devices 310a, 310b, 310c may send feedback to an AP about LTE® activity triggering WLAN channel change. The AP may retain at least one device (e.g., device 310a) on the channel to determine if the coexistence issues decrease over time. If the coexistence interference stabilizes at an acceptable level the devices may be returned to their original configuration.

However, if all APs and devices in a region engage in this behavior it may simply result in more WLAN APs and/or their devices clustering onto the same channels. This may further reduce WLAN performance. In order to have a seamless channel switch at the AP, it may be preferable for clients to support Channel Switch Announcements (CSA) as defined in IEEE 802.11h, or as would be understood by one skilled in the art to modify as discussed herein. However, some clients may not support the current version of CSA, or a modified CSA in a 2.4 G band. In order to facilitate the dynamic change of channel, the regulatory bodies and Wi-Fi Alliance (WFA) (or a proprietary protocol among devices) may mandate the channel switch announcement (CSA) support on WLAN APs and clients. The LTE® standard may also be modified to move the LTE® signal away from the 2.4 GHz WLAN band when possible to mitigate interference. Accordingly, various embodiments temper and complement channel transitions using other factors discussed herein. However, modification of the standards may not be pragmatic given the diversity if interests in the industry, and so various embodiments instead implement a factor-based triage-like determination of how best to handle coexistence artifacts.

EDCA and CCA Dynamic Adjustment

Trial experiments demonstrated poor performance on some WLAN APs and clients as a consequence of various WLAN MAC layer issues, e.g., fixed energy detected and EDCA parameters. Sometimes, the WLAN transmitter may back off from transmission when the signal and energy detected on a channel is above a threshold, e.g., a threshold as defined in IEEE 802.11 specification. Accordingly, some embodiments contemplate dynamically adjusting this threshold to defer such back off.

The interference level may increase with the number of radios in one device (LTE®, Bluetooth, etc.). These radios and the radios of nearby devices may increase the idle energy level above a WLAN energy detection (ED) threshold and/or above receiver's packet detection threshold. In such circumstances, the WLAN device may not attempt an transmission because it may false-detect the presence of packets from other WLAN devices or it may back off transmission due to energy exceeding the ED threshold, as defined in IEEE 802.11 specification. For example, experiencing LTE® band 40 interference in some of the WLAN radios with good Rx sensitivity may stop the WLAN transmitter from getting on the air because the interference from LTE to WIFI™ may be above the predefined energy detection threshold that is defined in the IEEE 802.11 specification. In order to avoid client disconnect in a situation where there is continuous interference from LTE to WIFI™ and the interference level is above the standard defined threshold, the WIFI™ client or AP may increase their energy detection threshold beyond what is defined in the spec. In some embodiments, the user device may ignore the threshold all together. By ignoring the threshold, the WIFI™ client or AP may have a chance to transmit over the air so that some packets go through.

The level at which the ED threshold is increased or when the threshold is removed may be determined based on device capabilities including, e.g., the transmit power, receive sensitivity, type of channel coding (LDPC or BCC) or any interference cancellation capability, number of transmit and receive antenna, beam forming capability, null steering capability, etc. Some WIFI™ devices may be able to communicate when there is interference from LTE while some may not. The effect of a given level of interference may vary from device to device. Accordingly, a device manufacturer may set a threshold range in which its device may be used when LTE interference is present.

The AP or client may also take into account their peer device's capabilities when they change the ED threshold. If the other devices can perform well in interference they may transmit their packets in the presence of a higher level of interference. The WIFI™ device may learn the capability of the other device from the association process or it may learn the capability of the other device by trial and error. For example, an AP may keep changing the ED threshold for each associated client independently of other clients by keeping track of what percentage of packets are successfully transmitted to each clients at different level of ED threshold. Trial and error and capability exchange at association may be used in combination to determine the appropriate threshold. For example, a client with LDPC coding support may have a different ED threshold range than can be searched using trial and error as compared to a client with BCC support.

In some embodiments, the WLAN energy detected (ED) threshold may be dynamically adjusted based upon the environment in which the device is used. Each device may change ED threshold based on its capabilities and the type of interference.

In some embodiments, the access point may make a decision to change the ED threshold for itself or for clients that are associated with it. The AP sends a frame indicating to all associated clients that the ED threshold is changed to a new value. The change of the ED threshold may be communicated using a beacon, action frames, or other management and control frames. The ED change may also be communicated using unicast frames, including unicast data frames. The ED threshold may be different for the AP and clients or between different clients.

The wireless LAN device may also adjust CSMA/CA parameters such as CWMIN, CWMAX, and AIFS dynamically such that the transmitter is not too conservative or too aggressive in its attempts to get on the air. These adjustments may depend on the level of interference, channel activity, LTE® traffic and other parameters.

Generally, there are 4 different types of defined EDCA traffic categories: voice, video, best effort, and background. The AP or client may change the EDCA parameter for each category independent of the other categories. The client may attempt to be more aggressive in getting on the air if there is a very low rate of traffic for each category and the timing is critical. For example, in applications where a delay would be experience by a user, the packet may be transmitted aggressively (e.g., when transmitting to a remote display, or transmitting a sensor value from a security breach at a window).

However, if there is lot of LTE interference and lot of HTTP TCP transfers, the device may transmit less aggressively. If the client is too aggressive in these situations, some of the packets may not be transmitted successfully using WIFI™. The TCP connection may notice the packet failure and may reduce its window size (the TPUT value will accordingly be reduced). The EDCA parameters may be modified based on parameters on both sides of a WIFI™ link. The transmitter may consider, e.g., its own capabilities, the capabilities of the receiving device, the type of traffic it is transmitting, etc. to determine a range for each EDCA parameter being changed. After the range is determined, the client may identify the best value by trial and error for each EDCA parameter. The best value for each EDCA parameter may change from time to time based on the traffic type that the WIFI™ device is sending and the interference it is experiencing. As a result, the EDCA parameter change may happen dynamically and the value for each parameters may be updated over time.

Protocol Extension for EDCA

Some embodiments contemplate adding an information element to beacon messages which change EDCA or ED parameters for all clients or subgroup of clients based on a coexistence determination as considered herein. Action frames may be used to modify EDCA and ED parameters for a specific client, a group of clients, or all clients due to coexistence issues.

Extending Channel Switch Protocols

Some embodiments propose the use of an extended channel switch announcement element and/or extended channel switch announcement used in beacon and other frames to cover switches between two different bands (example 2.4 GHz and 5 GHz, 2.4 GHz and sub1G, 5 GHz and 60 GHz).

A Channel Switch Announcement frame which uses the Action frame may be extended to cover switching between different bands as discussed above. A channel switch mechanism may be targeted to a single client or group of clients. The client MAC Address or AID may be used to specify the clients in a beacon or action frame.

In some embodiments, if the AP recognizes that the software or hardware queues are building up for a client, or sees that a delay requirement is not being satisfied for a client, the AP may make the decision to move the client from one band to another band.

In some embodiments, the AP may perform deep packet inspection (DPI) to determine the type of traffic. Based on the DPI results for each client packet, the AP may decide which client to keep on each band and which client to move. For example, the AP may recognize a large file download via DPI when the band is busy and subject to LTE interference. The AP may decide to move the download to another band as a download is not timing critical requires considerable bandwidth. Conversely, the AP may recognize via DPI that a person is playing an interactive run and shoot game which does not require much bandwidth, but does require minimal delay. Since an increase in delay may not be tolerated, the AP may decide to keep the client on the same channel for the time being.

Transmitter Improvements

In some WLAN devices, the devices transmit at the maximum transmit power allowed by the hardware and regulation even when the link can be maintained with less transmit power. Instead, the transmit power on a WLAN client and access point may be reduced in some embodiments when there is enough link margin or when activity in the adjacent band is detected.

Some embodiments contemplate adding management frames (e.g., specified in an addition to the IEEE 802.11™ specification) to facilitate the communication or detection of LTE® signals between WLAN devices and the subsequent adjustment of a Tx power level at each of the devices.

Some embodiments consider new management frames which may be defined in the 802.11 specification for a client to report back to an AP that it is experiencing LTE interference (e.g., as discussed herein in greater detail with respect to TPC-related functions). For example a cellphone client may have both an LTE radio and a WIFI™ radio. The cellphone client may look for LTE interference on different bands and may send a packet to a WIFI™ AP indicating the presence of LTE interference. The AP may not have an LTE radio and may be unaware that there are LTE signals present that can interference with WIFI™.

Test cases may be added in the Regulatory or Wi-Fi certification to check for transmit power control (TPC). The LTE® UE may also reduce transmit power to improve coexistence when possible. Consequently, the LTE® eNB may take into account reduced transmit power when scheduling resources for communication with the LTE® UE. Some embodiments also contemplate the use of a more linear power amplifier to reduce intermodulation products. These improvements may be complemented by better frequency planning within WLAN chipsets to reduce spurious emissions. However, as mentioned, as adjustments to the regulations may not be practical, various embodiments instead contemplate a triage-like assessment and response to the coexistence condition.

IEEE Transmit Power Control (TPC) Extension for Coexistence

Some embodiments contemplate changing the client or AP transmit power control defined in "10.8 TPC procedures" of the IEEE 802.11-2012 specification. These transmit power controls are presently be defined for radar band, but may be extended to cover different bands where LTE® coexistence is an issue. Standard 802.11 h includes two TPC-related functions: a function for specifying the maximum power and another function for determining line margin information from the other side of the link. Various embodiments use these mechanisms in a protocol to facilitate WIFI™-LTE coexistence.

For example, the AP in an infrastructure BSS or a wireless station in an independent BSS may advertise the regulatory and local maximum-power level for the current frequency channel in the Beacon and Probe Response frames. This may be done using Country and Power Constraint elements. The local maximum may specify the actual maximum power level allowed in the BSS, which may be less than or equal to the regulatory maximum. The stations in the BSS can use any transmit power less than or equal to the local maximum.

The Power Constraint element may contain the information necessary to allow an STA to determine the local maximum transmit power in the current channel. Instead of using the power constraint element only in beacons, probe responses and association responses, various embodiments use the power constraint element in a frame which can be addressed to a specific client to reduce or increase its power when needed. In this manner, the client power can be adjusted dynamically. By changing the power the AP can reduce the interference to LTE when needed by decreasing the power, or it can increase the link margin in the wireless LAN by increasing the power when needed.

In some embodiments, if one device in an WIFI™ link has critical information to transmit, it can ask the other side of the link to increase its transmit power to improve the signal-to-noise and interference ratio (SINR).

In some embodiments, instead of relying on a dedicated frame for sending the power constraint element, the power constraint element may be combined with a data frame and sent to a specific WIFI™ device. In some embodiments, a new power constraint may be used which is specifically targeted for wireless coexistence issues. In the new element, in addition to what the power constraint element already includes, the element may also indicate the type of LTE interference, the power of LTE interference, the percentage of the time that the LTE interference is active, etc. In this element, one byte may be used, e.g., to indicate the type of LTE interference, one byte may be used to indicate the power of the interference, and one byte may be used to specify what percentage of the time the interference is active.

802.11h also provides a transmit-power reporting mechanism. The standard includes a TPC Report element that contains Transmit Power and Link Margin fields. The Transmit Power field contains the transmit power used to transmit the frame containing the TPC Report element, while the Link Margin field contains the link margin. The link margin is calculated as the ratio of the received signal strength (of the corresponding TPC request frame) to the minimum desired by the station. In accordance with the standard, TPC Report elements are included in TPC Report frames in response to TPC Request frames.

The TPC Request element and TPC Report element are defined in 8.4.2.15 and 8.4.2.16. Some embodiment use the above mechanisms as defined to reduce or increase the WIFI power as desired. Some emboidments reduce the WIFI™ power when possible using these mechanisms to decrese interference to LTE. The path loss and link margin estimates may be used to dynamically adapt the transmit power to the minimum required for the targeted data rate. Conversely, if the link margin does not look good in the report, and the AP or client knows there is LTE interference, the power may be increased to a value where the targeted data rate can be achieved.

Various embodiments also include a report request built on the foundation of the TPC report procedures as already defined. For example, additions may be made to the report request targeted to coexistence issues including WIFI™ LTE coexistence issues. The report request may optionally ask clients for feedback on different types of coexistence issues including LTE®/WIFI™ coexistence issues, Bluetooth coexistence, WIFI™ Zigbee coexistence, and WIFI™ unidentified interference coexistence issues.

In the response frame, the other side of the link may provide information regarding the type of interference intensity from LTE or other radios. It may also give a grade indicating how much performance degradation is expected as a result of LTE or other type of radios interference. The performance degradation grade or percentage may be used by the AP to decide what data rates, transmit power, EDCA parameter modifications, and ED threshold modifications should be used when communicating with the client reporting an issue. The degradation percentage may also be a factor in deciding which client shall be moved from one band to other band and when the transition is to occur.

WLAN Receiver Interference Handling

Experimental measurements have indicated that different WLAN chipsets experience wide variations in interference from LTE®. Some of the WLAN chipsets perform very poor when there is interference in adjacent channels or bands. To improve the ISM band and adjacent bands' efficiency, the WLAN receiver interference specification may be modified such that an acceptable interference tolerance is maintained on WLAN receivers. Test cases may be added to the qualification process where interference requirements are tested on Wi-Fi devices which have LTE® as well.

Various embodiments use the TPC request, report element, and modified request frame as a feedback to receive path software. The receiver may use the report information to change the hardware and software setting to achieve the best performance possible when there are LTE coexistence issues. For example the radio gain distribution may be modified if the feedback frame indicates that there is a bad link margin and/or high level of interference level degradation. The packet processing threshold may also be modified when a high interference level is reported.

The WiFi™ radio frontend gain (e.g. LNA gain) may be reduced when a high interference level is reported in neighboring LTE band so as to avoid frontend radio saturation. The classification algorithm used to detect WiFi™ packets may also be modified so as not to mis-detect LTE interference as WiFi™ packets.

WLAN Channel Switching

If all the receiver and transmitter mitigations fail to bring the link quality up to any of the associated clients, the AP may choose to change the channel of the radio which is facing the coexistence issue. When the channel change happens, the AP takes into account the LTE coexistence when it picks the new channels. The AP may ask other clients for feedback on LTE interference on all channels on the bands upon which the radios operated before it issues the channel switch. The LTE interference feedback may be used in addition to the other statistic that the AP collects to pick the best channel.

Filter-Based Improvements

Some embodiments consider applying improved filters in LTE® or ISM equipment to reduce out of band emissions for both class of devices so that they can meet a tighter spectral mask specification. Sharper filters may be used in receivers to improve the interference tolerance by filtering out the undesired signal (in some situations, this may impact pass band performance by 1~2 dB). Extra filtering may also be applied in some embodiments. For example, within WLAN or LTE systems-on-a-chip (e.g., inter-stage filters) may be applied. Front end module (FEM) filters, discrete parts filters, ceramic (e.g., low temperature) filters, film bulk acoustic resonator (FBAR)/Surface acoustic wave (SAW) filters, bulk acoustic wave (BAW) filters, or other filters may also be used. High rejection filters with steep skirts may be used for the radios in some embodiments.

Figure 4:
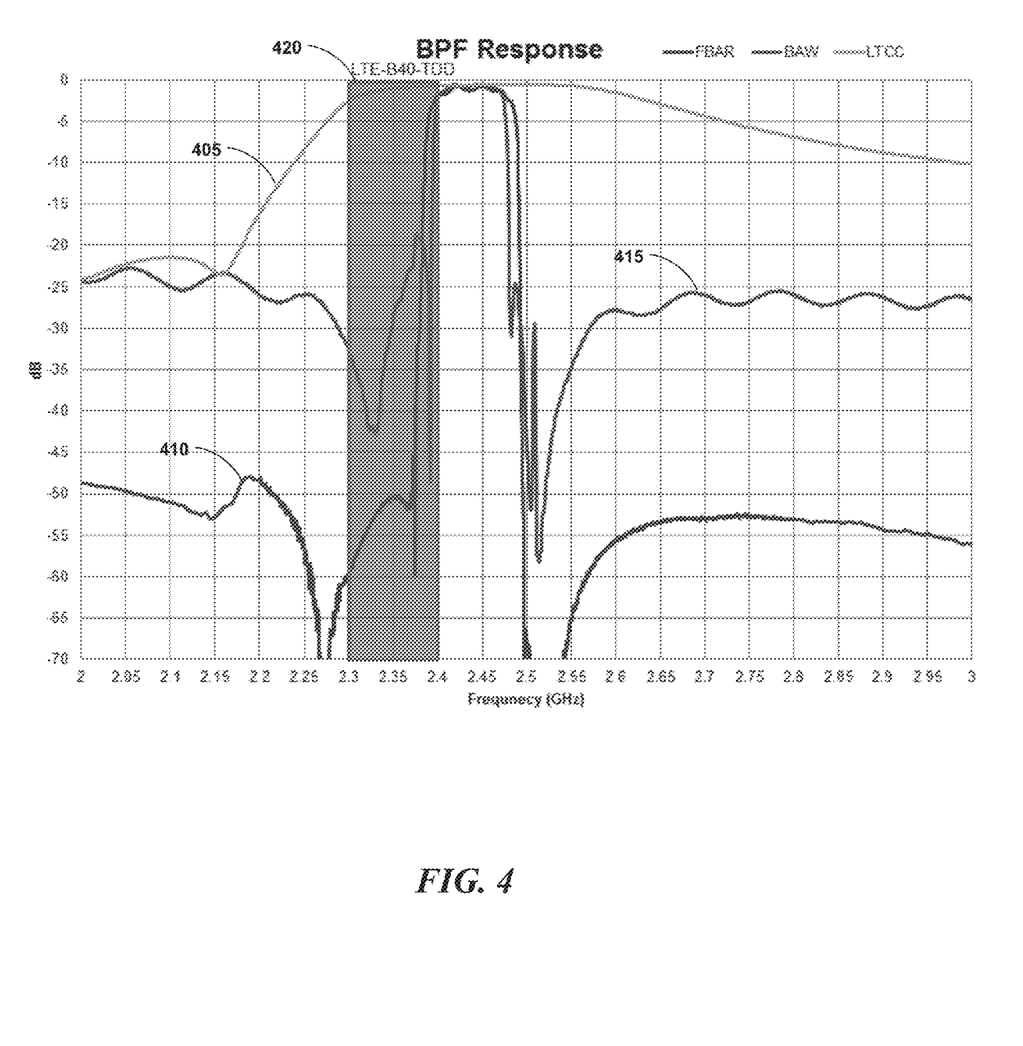
FIG. 4 is a plot of a Band-Pass Filter (BPF) response experienced during testing.

FIG. 4 is a plot of a Band-Pass Filter response experienced during testing. A bandpass filter 420 may isolate FBAR 410, BAW 415, and LTCC 405 signals in a 2.3-2.4 GHz region.

LTE® TDD Deployment

When both LTE® and BT/WLAN are in the same router, isolation beneath 30 dB may suffice to effect antenna isolation. When on separate routers, interference from nearby WLAN access points, clients, LTE® handsets, small cells on band 40, etc. may be avoided by effecting antenna isolation >40 dB. Interference from high power base stations close by may be avoided by effecting >100 dB antenna isolation (though this interference may be rare in some situations).

Time Division Multiplexing Based Solution

Time division multiplexing may be used to avoid interference from one radio to another by time separation between activity of the radios. This method may be the least desirable for WLAN devices considering the asynchronous nature of wireless LAN protocol. In some situations, only the device with LTE® capability may schedule its WLAN transmit traffic in TDM fashion accurately. Other devices with only WLAN capability may not be able to do so. In some usage scenarios, an LTE® UE can use WLAN to offload traffic from LTE® to the WiFi™ transceiver and ease the coexistence issues. Similar modifications based on WLAN Base Station Coexistence (e.g., as defined in IEEE 802.15.2 Coexistence Mechanism) may also be applied.

Offloading Signal Due to Coexistence

Some embodiments consider adding signaling between a WiFi™ module and LTE® UE module, LTE® eNB which facilitate offload from LTE® to WiFi™ due to coexistence issues. Due to coexistence issues the LTE® UE may determine that it is better if it received data over WiFi™ rather than LTE®.

The LTE® UE may communicate the need to offload congestion to an LTE® eNB. The eNB may then coordinate the redistribution of channel allocations.

LTE® Band 40 and Wi-Fi in Same Device

In a device having both LTE® and Wi-Fi components, some embodiments provide time sharing of the wireless medium between the components. If LTE®-TDD is using the upper 20 MHz, the entire 2.4 G WLAN band may be severely de-sensed. When Bluetooth or WLAN is using the lower 20 MHz, it may de-sense the LTE® across the band. Channel selection may try to avoid this outcome if the device is an AP but the client cannot change the channel. Hardware coexistence may be used between WLAN and LTE® modules on a same device. For example, both LTE® and WLAN TPUT may drop and there will be congestion on WLAN. Adaptive power backoff may also be adjusted on both WLAN and LTE®. When a WLAN AP or client is transmitting Voice over IP (VoIP) or a video conference, there may be interruptions if LTE® is active for a long period of time. Conversely, if Voice over LTE® (VoLTE) is used there may be interruption if WLAN is active for long time.

Adaptation Process

Figure 5:
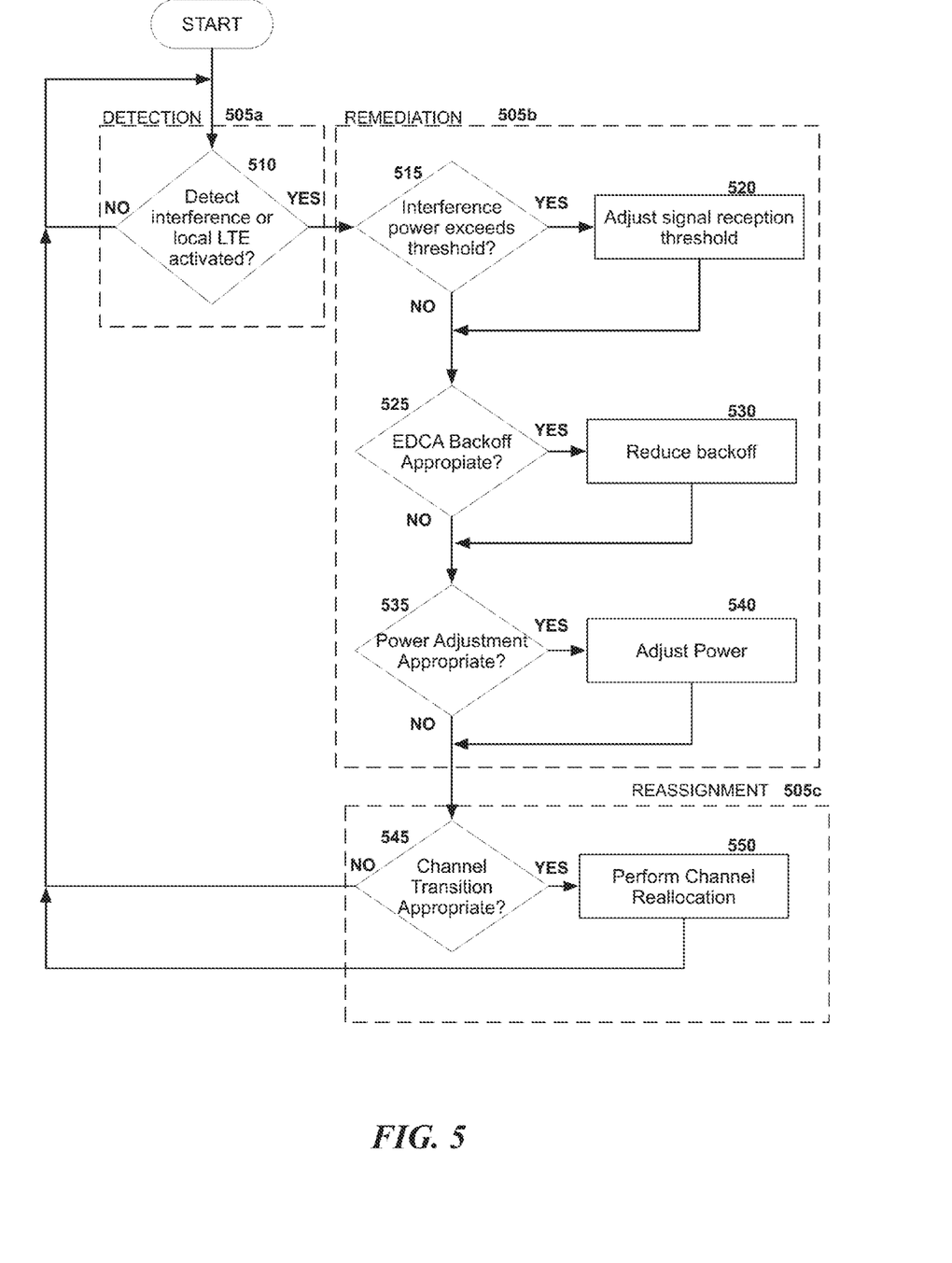
FIG. 5 is a flow diagram illustrating an adaptation process as may be implemented in some embodiments.

FIG. 5 is a flow diagram illustrating an adaptation process as may be implemented in some embodiments. Generally, adaptation may involve detection 505a, remediation 505b, and reassignment 505c phases. During detection 505a the device may determine if LTE® interference is present. This determination may be made locally or with the assistance of another device. For example, an access point may receive a congestion indication from one of its clients, alerting it to the present of LTE® interference. LTE® interference may be distinguished from other environmental factors based on pattern recognition or context. For example, a user smartphone supporting both ISM and LTE® communication may notify the access point when LTE® communication is activated.

Once interference has been identified the system may proceed through one or more remediation 505b activities. For example, if the interference power exceeds a threshold at block 515 the system may adjust the signal reception threshold (e.g., an autocorrelation threshold) at block 520. At block 525, the system may determine if EDCA backoff limits are appropriate. If warranted at block 525, the backoff may be reduced at block 530 to increase the rate at which transmissions are attempted. This may result in an escalation, where the LTE® device increases the amplitude and/or frequency of its transmissions to accommodate for the EDCA backoff response. At block 535, the system may determine if it's appropriate to adjust the transmission and/or reception power at block 540. For example, the AP may make a distance determination to a client device and increase/decrease the power accordingly in view of the interference. The AP and client may exchange messages to establish new power levels. Though not illustrated, remediation 505b may include additional verifications and assessments, including, e.g., a determination whether time division multiplexing would suffice to mitigate the interference.

The compensating actions taken during remediation 505b may be based upon a weighted average of factors related to the interference. For example, the power intensity of the interference, the duration for which the interference has been experienced, etc. may all be taken into consideration when determining whether to remediate (e.g., extend backoff durations, adjust transmission power levels, etc.). Remediation may be performed iteratively until the weighted average of anticipated adjustments exceeds a threshold (e.g., it's determined that increasing the backoff and further refining the signal threshold would be counterproductive). If remediation 505b does not resolve the difficulties, then during the reassignment 505c phase, the system may effect a transition at block 550. The determination whether to effect a transition at block 545 may likewise be determined based upon a second weighted consideration of interference-related factors. Thus a decision to discontinue remediation may or may not directly result in a channel transition. The transition at block 545 may also consider factors associated with reallocation, e.g., the number of devices already operating on another band of frequencies.

Figure 6:
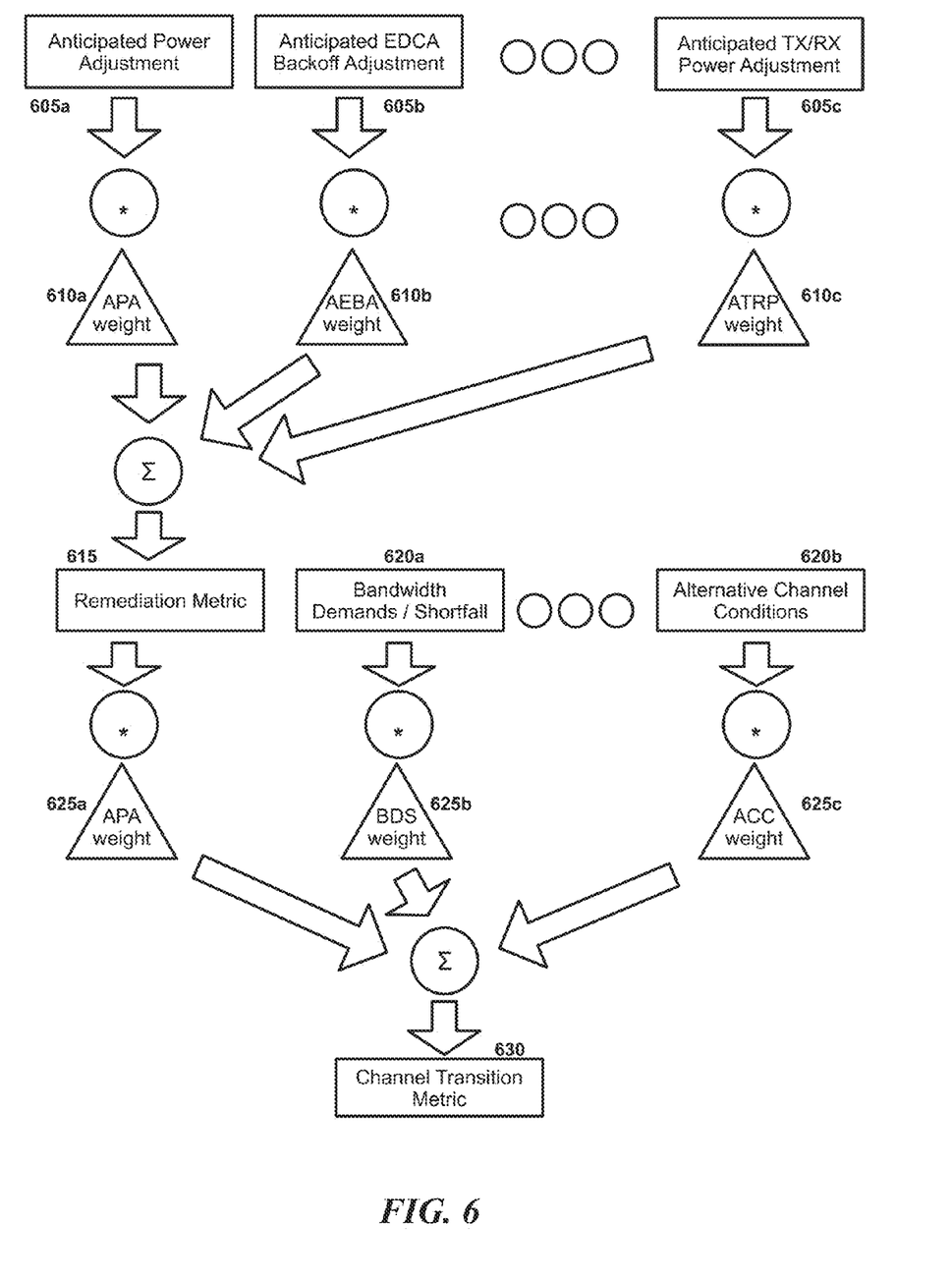
FIG. 6 is a block diagram illustrating a cascaded weight-based factor assessment for generating a remediation and channel transition metric as may be implemented in some embodiments.

FIG. 6 is a block diagram illustrating a cascaded weight-based factor assessment for generating a remediation 615 and channel transition metrics 630 as may be implemented in some embodiments. As indicated, a remediation metric 615 may be generated as a weighted sum of various remediation factors, such as an anticipated power adjustment 605a, EDCA backoff 605b, TX/RX power adjustment 605c etc. These factors may reflect the planned adjustments in the next iteration of remediation if the coexistence continues to mitigate desired levels of communication. These factors may be normalized by their corresponding weights 610a, 610b, 610c so that their effects on communication may be assessed. Thus, the remediation metric 615 may be used to determine whether additional remediation is suitable given the current interference.

A channel transition metric 630 may also be generated by taking a weighted sum of the remediation metric 615 with other channel condition factors, e.g., the quality of alternative channels 620b, the difference between the desired bandwidth for applications and that which is presently possible with the coexistence 620a, etc. with various scaling factors 625a, 625b, 625c. The system may elect to initiate a channel transition based upon the channel transition metric's relation to a threshold. Though depicted as sums of weighted values in this example, one will recognize that business rules may also determine whether remediation is performed or channel transitions are made.

Computer System

Figure 7:
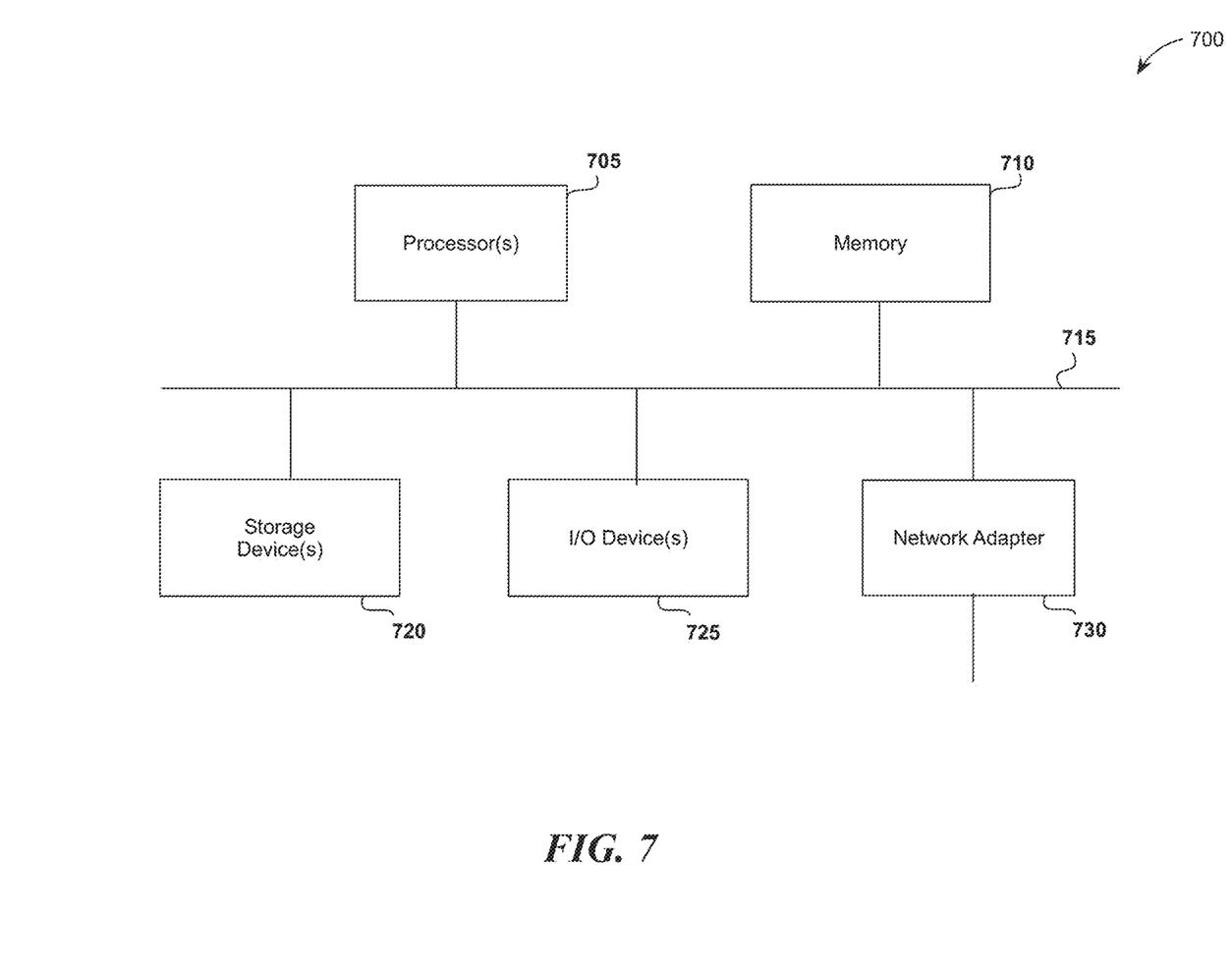
FIG. 7 is a block diagram of a computer system as may be used to implement features of some of the embodiments.

FIG. 7 is a block diagram of a computer system as may be used to implement features of some of the embodiments. The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A computer-implemented method for improving LTE and Wi-Fi coexistence in a network, comprising:
   determining a first measurement of channel quality in a first wireless band; detecting the presence of interference in a first wireless band;
   determining a duration of the interference in the first wireless band; determining an interference power level of the interference in the first wireless band;
   determining that the interference power level exceeds a threshold;
   reducing a backoff interval based upon the duration and the interference power level;
   increasing a transmission power level based upon a weighted sum of normalized factors including the duration and the interference power level;
   determining a second measurement of channel quality in the first wireless band following the reducing the backoff interval and following the increasing the transmission power level; and
   effecting a channel transition from the first wireless band to a second wireless band based on the second measurement of channel quality.

2. The computer-implemented method of claim 1, wherein the first wireless band comprises frequencies substantially between 2400 MHz and 2500 MHz and wherein the second wireless band comprises frequencies substantially between 5.725 GHz and 5.875 GHz.

3. The computer-implemented method of claim 2, the method further comprising:
   determining that a first component on a wireless device communicates on a frequency between 2300 MHz and 2400 MHz simultaneously with a second component communicating in the first wireless band.

4. The computer-implemented method of claim 3, wherein the effecting a channel transition is further based on the determination that the first component on the wireless device communicates on a frequency between 2300 MHz and 2400 MHz simultaneously with the second component communicating in the first wireless band.

5. The computer-implemented method of claim 1, wherein reducing a backoff interval based upon the duration and the interference power level comprises determining that a weighted sum of normalized factors including the duration and the interference power level exceeds a threshold.

6. The computer-implemented method of claim 1, wherein the backoff is an EDCA backoff.

7. The computer-implemented method of claim 1, wherein determining a first measurement of channel quality in a first wireless band comprises receiving a management frame from a client device, the management frame indicating a presence of LTE interference via performance degradation.

8. The computer-implemented method of claim 1, the method further comprising transmitting a transmit power report element indicating a power adjustment compensating for the LTE interference.

9. A non-transitory computer-readable medium comprising instructions configured to cause at least one processor to perform a method comprising:
    determining a first measurement of channel quality in a first wireless band; detecting the presence of interference in a first wireless band;
    determining a duration of the interference in the first wireless band; determining an interference power level of the interference in the first wireless band;
    determining that the interference power level exceeds a threshold;
    reducing a backoff interval based upon the duration and the interference power level;
    increasing a transmission power level based upon a weighted sum of normalized factors including the duration and the interference power level;
    determining a second measurement of channel quality in the first wireless band following the reducing the backoff interval and following the increasing the transmission power level; and
    effecting a channel transition from the first wireless band to a second wireless band based on the second measurement of channel quality.

10. The non-transitory computer-readable medium of claim 9, wherein the first wireless band comprises frequencies substantially between 2400 MHz and 2500 MHz and wherein the second wireless band comprises frequencies substantially between 5.725 GHz and 5.875 GHz.

11. The non-transitory computer-readable medium of claim 10, the method further comprising:
    determining that a first component on a wireless device communicates on a frequency between 2300 MHz and 2400 MHz simultaneously with a second component communicating in the first wireless band.

12. The non-transitory computer-readable medium of claim 11, wherein the effecting a channel transition is further based on the determination that the first component on the wireless device communicates on a frequency between 2300 MHz and 2400 MHz simultaneously with the second component communicating in the first wireless band.

13. The non-transitory computer-readable medium of claim 9, wherein reducing a backoff interval based upon the duration and the interference power level comprises determining that a weighted sum of normalized factors including the duration and the interference power level exceeds a threshold.

14. The non-transitory computer-readable medium of claim 9, wherein the backoff is an EDCA backoff.

15. A computer system comprising:
    at least one processor;
    at least one memory comprising instructions configured to cause the at least one processor to perform a method comprising:
        determining a first measurement of channel quality in a first wireless band;
        detecting the presence of interference in a first wireless band; determining a duration of the interference in the first wireless band; determining an interference power level of the interference in the first wireless band;
        determining that the interference power level exceeds a threshold; reducing a backoff interval based upon the duration and the interference power level;
        increasing a transmission power level based upon a weighted sum of normalized factors including the duration and the interference power level;
        determining a second measurement of channel quality in the first wireless band following the reducing the backoff interval and following the increasing the transmission power level; and
        effecting a channel transition from the first wireless band to a second wireless band based on the second measurement of channel quality.

16. The computer system of claim 15, wherein the first wireless band comprises frequencies substantially between 2400 MHz and 2500 MHz and wherein the second wireless band comprises frequencies substantially between 5.725 GHz and 5.875 GHz.

17. The computer system of claim 16, the method further comprising:
    determining that a first component on a wireless device communicates on a frequency between 2300 MHz and 2400 MHz simultaneously with a second component communicating in the first wireless band.

18. The computer system of claim 17, wherein the effecting a channel transition is further based on the determination that the first component on the wireless device communicates on a frequency between 2300 MHz and 2400 MHz simultaneously with the second component communicating in the first wireless band.

19. The computer system of claim 15, wherein reducing a backoff interval based upon the duration and the interference power level comprises determining that a weighted sum of normalized factors including the duration and the interference power level exceeds a threshold.

20. The computer system of claim 15, wherein the backoff is an EDCA backoff.

21. The computer system of claim 15, further comprising:
    effecting a transition of a client from a first component on a wireless device to a second component on the wireless device in response to interference to establish communications via a component on the wireless device that has least negative affect on the client in view of said interference.

* * * * *